J. M. MEYERS.
TRACTOR.
APPLICATION FILED MAR. 31, 1913.
1,261,263.
Patented Apr. 2, 1918.
5 SHEETS—SHEET 3.
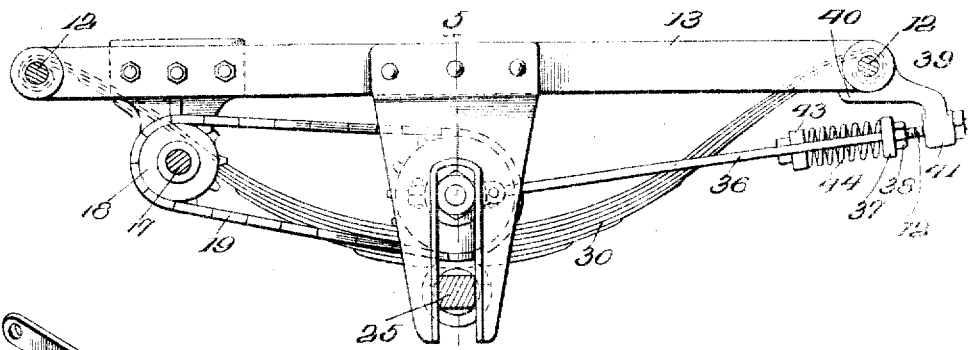
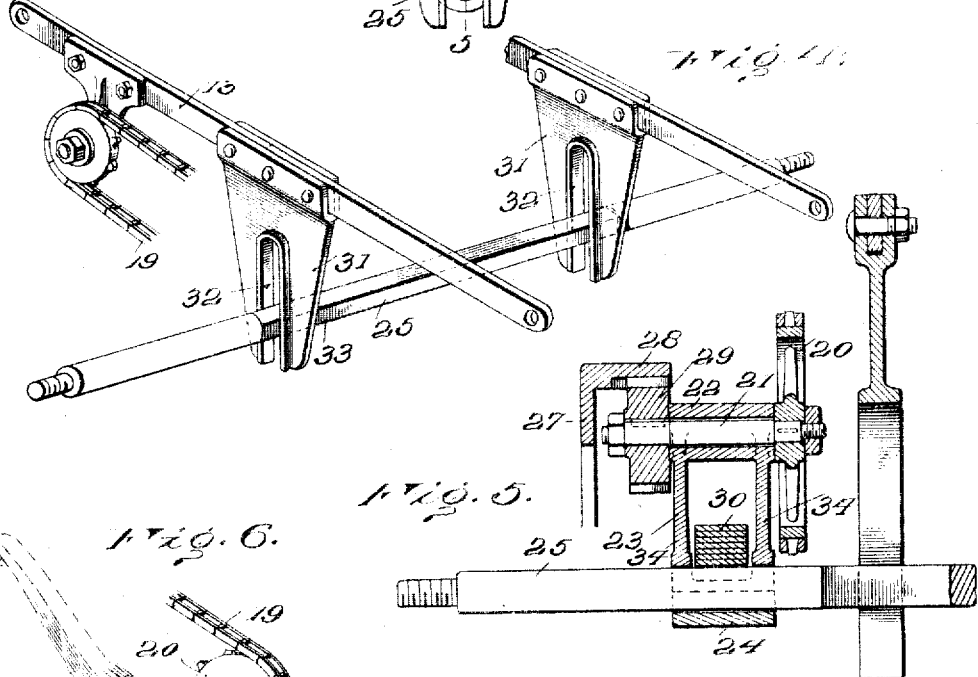
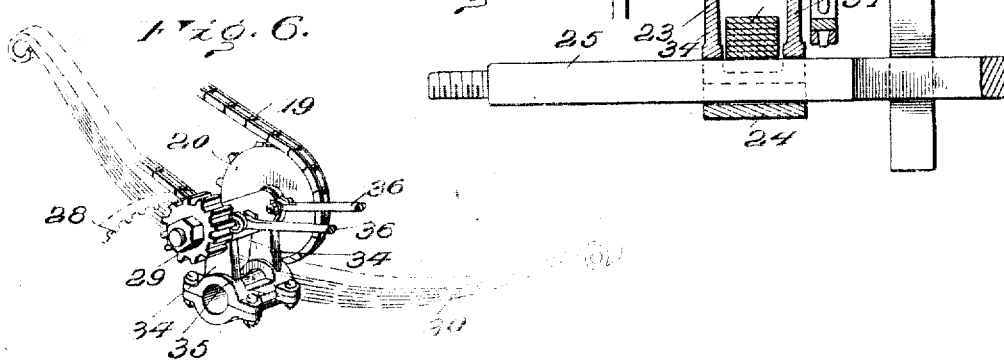
WITNESSES
INVENTOR
J. M. Meyers
By Rowe & Phelps, Attorneys

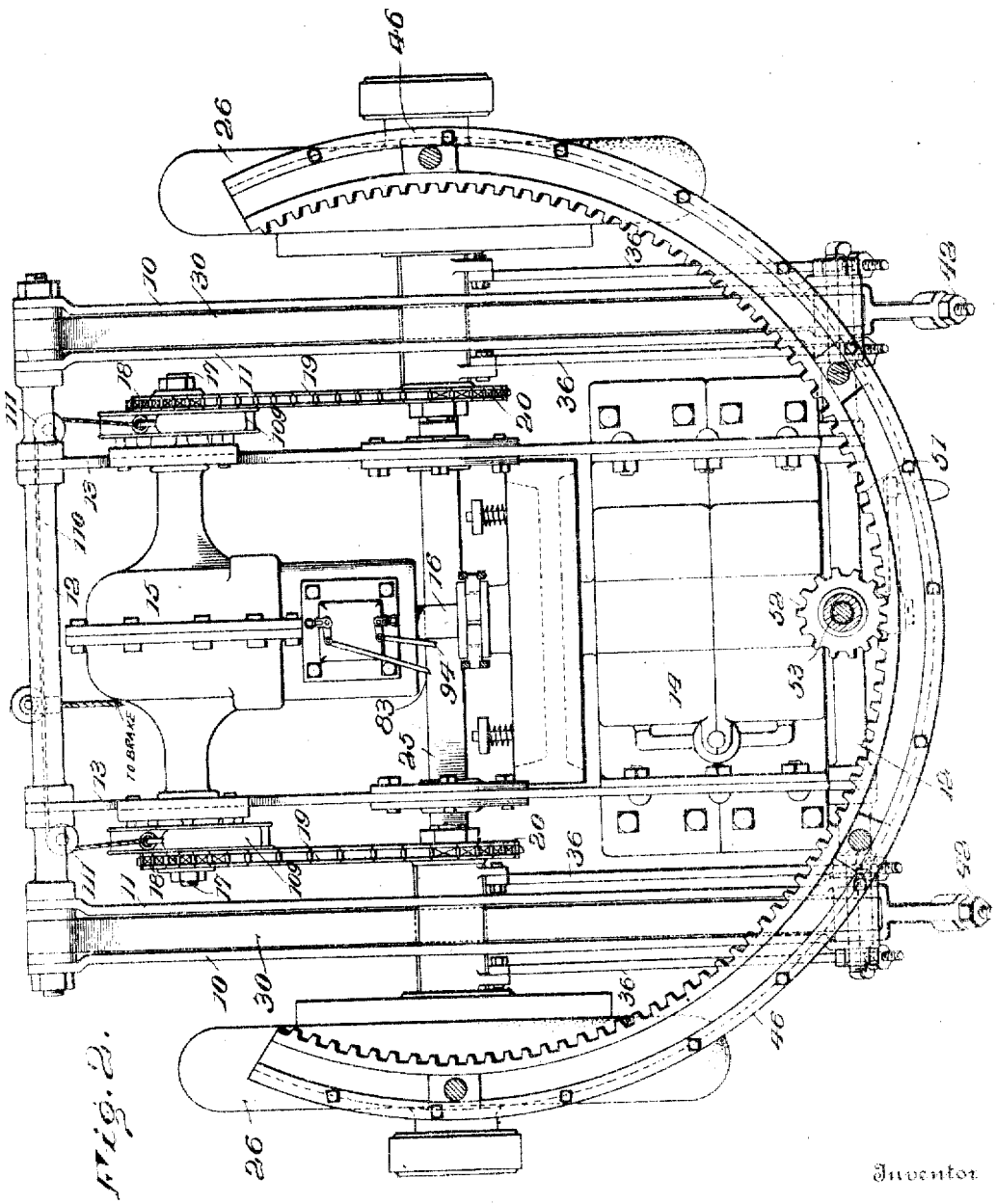

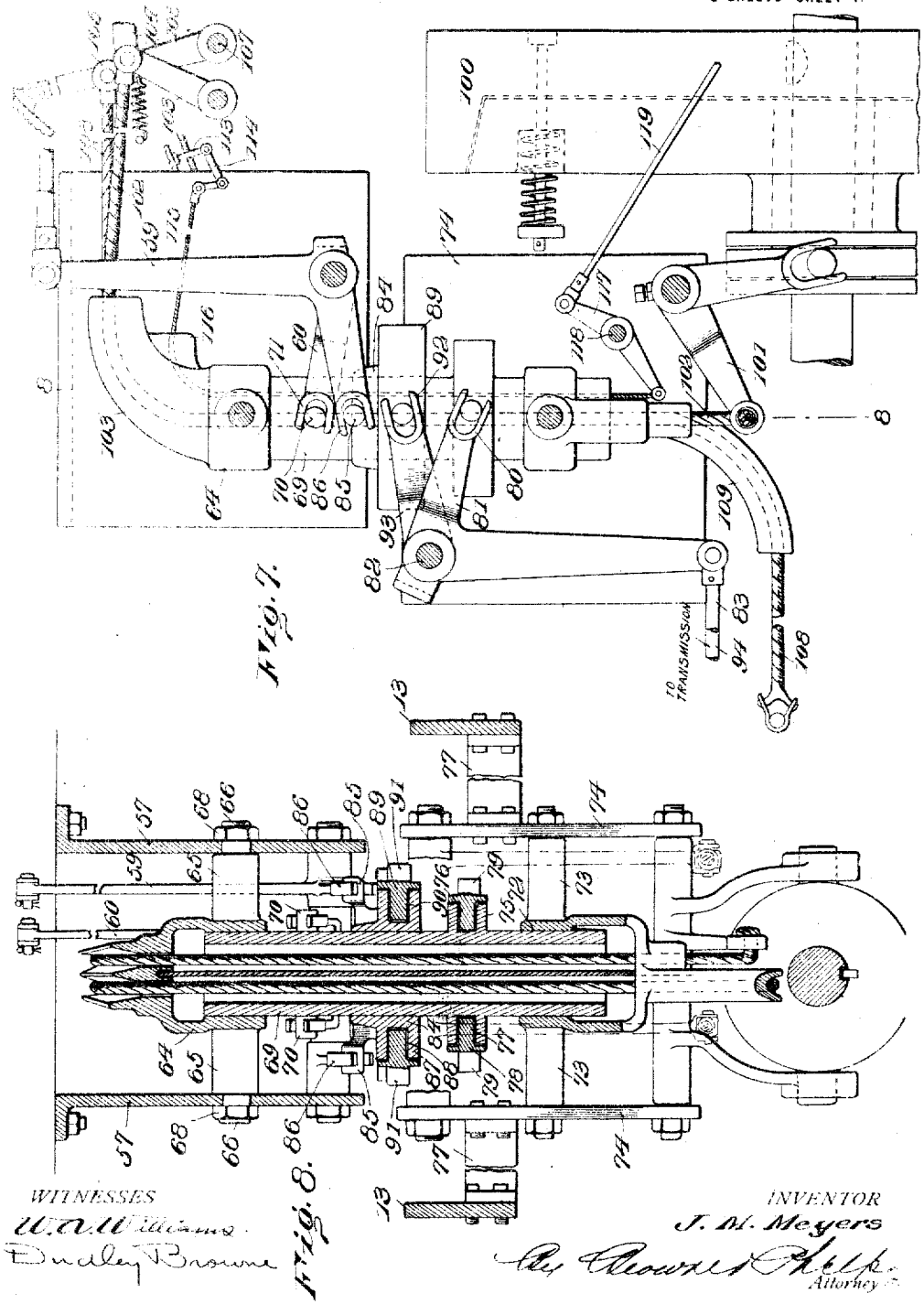

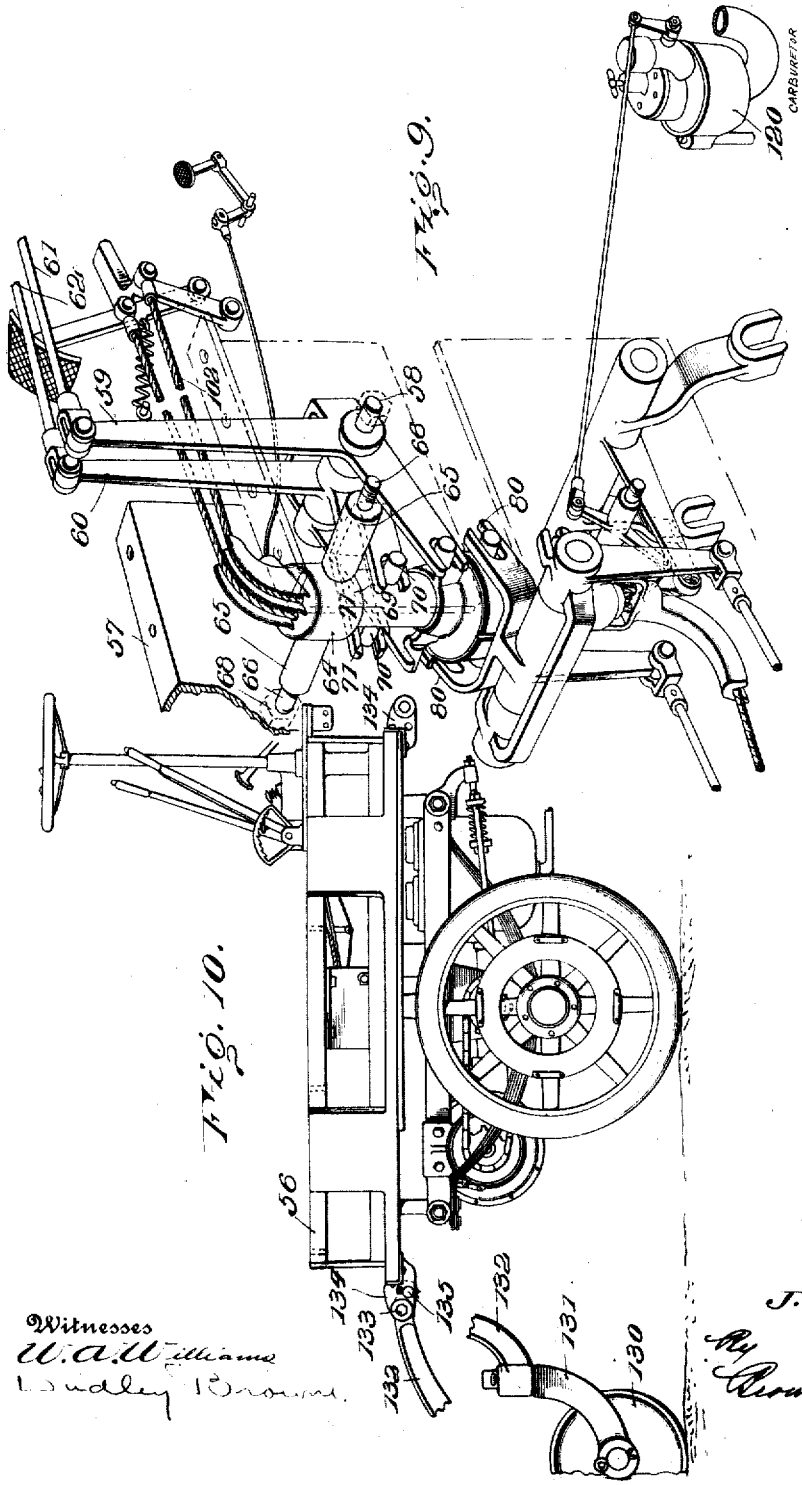

UNITED STATES PATENT OFFICE.

JOHN MAX. MEYERS, OF WEST CHESTER, PENNSYLVANIA.

TRACTOR.

1,261,263.                Specification of Letters Patent.      Patented Apr. 2, 1918.

Application filed March 31, 1913. Serial No. 757,920.

*To all whom it may concern:*

Be it known that I, JOHN MAX. MEYERS, a citizen of the United States, residing at West Chester, in the county of Chester and State of Pennsylvania, have invented certain new and useful Improvements in Tractors, of which the following is a specification.

My invention relates to certain new and useful improvements in tractors, and one object of my invention is to provide a tractor adapted to be readily substituted for the front wheels of a horse-drawn truck, fire-engine, or other vehicle, whereby the same may be readily and easily converted into a motor-driven vehicle.

A further object of my invention is to provide a tractor for an automobile truck or the like in which all the driving mechanism, together with the engine, is mounted on the tractor, the construction being such that should the engine or driving mechanism need repair the tractor can be easily and quickly removed from the truck, and another tractor substituted, whereby a person having a plurality of trucks need have only an extra tractor in order to enable repairs and overhauling to be made to the tractors.

A further object of my invention is to provide a two-wheel tractor which carries the motor and all the driving mechanism, and also in providing mechanism whereby the motor and the driving mechanism may be controlled from the body of the truck in convenient position for the driver.

A further object of my invention is to provide flexible connections which extend down through the center of rotation of the tractor from the truck to the mechanism of the tractor, whereby the mechanism of the tractor can be controlled by the driver from his seat, and the rotation of the tractor for steering the truck will not interfere with the control of the driving mechanism and engine.

A further object of my invention is to provide detachable means whereby the tractor can be supported in its upright position when detached from the truck or other vehicle, and to permit its being readily run when so detached.

Further objects of my invention will appear from the following description and claims.

With the foregoing and other objects in view my invention consists in certain constructions, combinations and arrangements of parts, the preferred form of which will be first described in connection with the accompanying drawing and then the invention particularly pointed out in the appended claims.

Referring to the drawings wherein the same part is designated by the same reference numeral wherever it occurs, Figure 1 is a side elevation of the front portion of a truck showing the same provided with my preferred form of tractor;

Fig. 2 is a top plan view of the tractor, with parts omitted to more clearly show the construction;

Fig. 3 is a detail side elevation of the mounting of the axle of the tractor, with parts omitted and the axle shown in section;

Fig. 4 is a detail perspective view of the axle mounting illustrated in Fig. 3;

Fig. 5 is a section taken on line 5, 5 of Fig. 3;

Fig. 6 is a detail perspective view of the hanger construction shown in Fig. 5;

Fig. 7 is a detail side elevation of the connections by which the engine and driving mechanism are controlled;

Fig. 8 is a section taken on line 8, 8 of Fig. 7;

Fig. 9 is a detail perspective view, with parts omitted, of the construction shown in Figs. 7 and 8, and Fig. 10 is a side elevation of my tractor removed.

Figure 1:
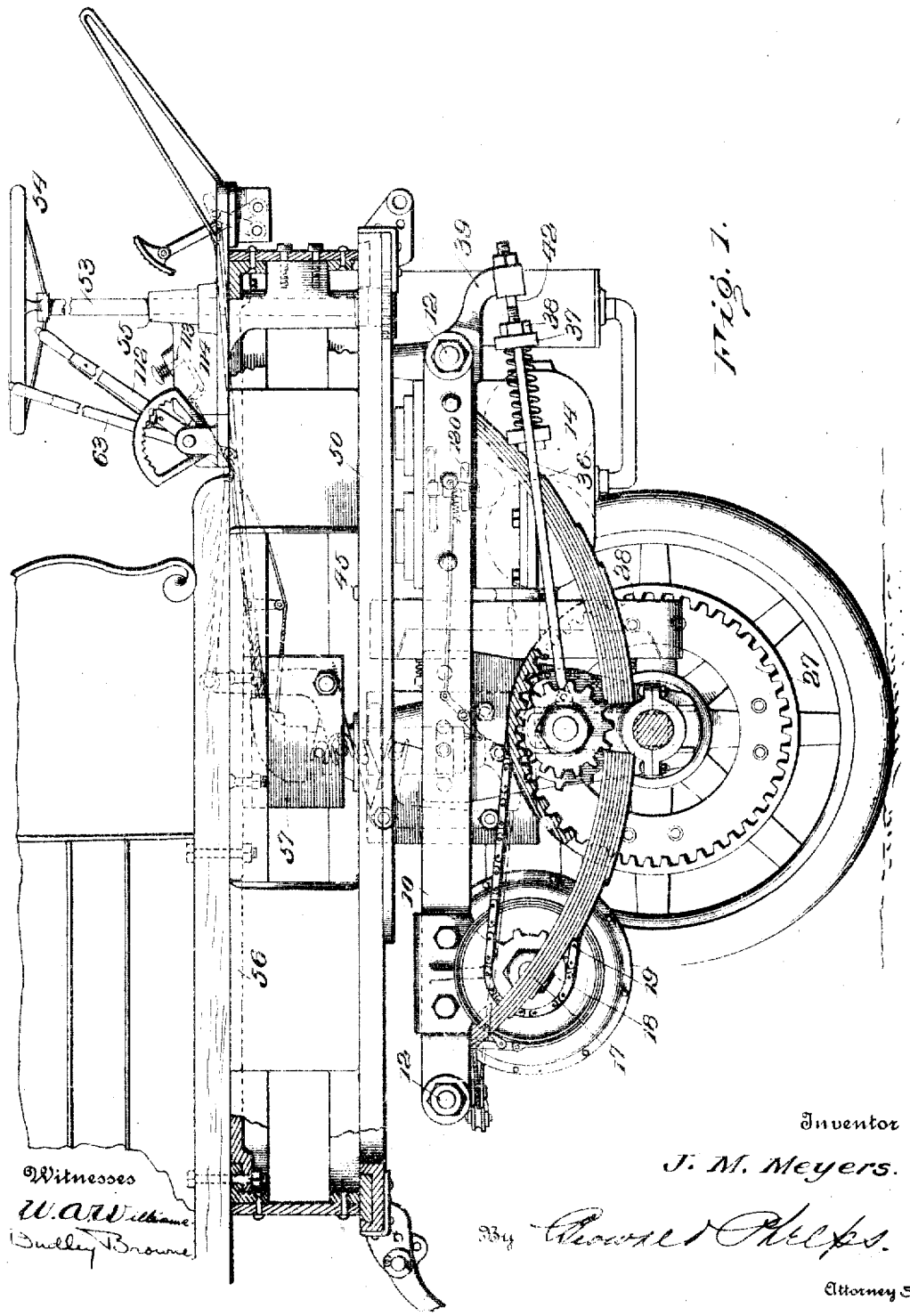

10, 11 indicate two pairs of bars, each pair of bars 10, 11 being spaced apart from each other, and the pairs connected together at their ends by means of the cross bars 12, the bars 10, 11 and 12 thus forming a rectangular frame, as best shown in Fig. 2. Extending between the cross bars 12 and intermediate the pairs of bars 10, 11 are the longitudinally extending bars 13, said bars extending parallel to each other, and 14 indicates a hydrocarbon engine of any ordinary or desired type, which engine is supported from the bars 13.

15 indicates a casing containing the transmission gears and also the differential, which casing is also suspended from the longitudinally extending bars 13. The transmission mechanism and the differential may be of any ordinary or desired type, as their construction forms no part of this invention. 16 indicates a drive shaft which extends from the engine 14 to the casing 15, and 17 indicates a pair of jack shafts extending out from the opposite sides of the casing 15, each carrying a sprocket wheel 18 connected by a sprocket chain 19 to a sprocket 20 fast on a shaft 21 journaled in a bearing 22 formed in one end of a bracket 23, the other end of the bracket being loosely mounted by a journal box 24 on the axle 25 of the tractor. The axle 25 extends from side to side of the tractor frame, and the center of the axle is in the same vertical line with the center of rotation of the tractor. The pair of wheels 26 for the tractor are rotatably mounted on the opposite ends of the axle 25, it being understood that the wheels revolve independently of each other upon suitable bearings formed on the ends of the axle. Secured on the inner face of each wheel 26 is a circular plate 27 carrying an internal gear 28, with which meshes a gear 29 fast on the shaft 21, whereby the jack shafts 17 will drive the wheels.

Mounted upon the cross bars 12 and between each pair of side plates 10, 11 is a spring 30, preferably of the ordinary type of half elliptic plate spring, the spring at its middle portion bearing upon the top of the axle. It is to be noted that by placing the springs between the plates 10, 11 that the springs are guided and side swaying of the frame and consequently of the truck is prevented. In order to guide the axle and cause it to move in a right line I secure to the intermediate bars 13 a pair of yokes 31, which are slotted as shown at 32 and which engage a squared portion 33 of the axle, whereby the axle is prevented from rotating, and is guided to move in a right line. In order to permit the spring to contact with the axle I form the yokes 23 with a pair of spaced arms 34, and cut away the bearing 24 of the yokes as indicated at 35, and as best shown in Fig. 6, between the arms 34, so that the spring contacts directly with the axle, and the yoke is permitted to have the necessary movement about the axle.

In order to prevent undue shocks and strains being transmitted to the jack shaft 17 and the power mechanism I provide means for keeping the sprocket chains 19 under constant spring tension, the preferred construction of this mechanism being as follows: Loosely connected to the bearing 22 of the bracket 23 are a pair of rods 36, which extend forwardly of the tractor, and at their forward ends pass through a plate 37, the outer ends of the rods being threaded to receive nuts 38.

39 indicates a lug mounted upon the front cross bar 12 and provided with an inwardly projecting finger 40 which rests against the underside of the longitudinal bars 10, 11. The lug 39 is also provided on its outer end with an eye 41, through which passes a rod 42, that loosely projects through an opening in the plate 37. The rod 42 carries at its inner end a head 43, and 44 is a coil spring mounted on the rod 42 and extending between the plate 37 and the head 43. 45 is a nut threaded onto the rod 42 through the eye 41.

From the foregoing construction it will be seen that the spring 44 will act to hold the sprocket chain 19 under a certain tension, which tension can be varied by the adjustment of the nuts 45 and the nuts 38 to properly correspond to the power delivered to the wheels.

Preferably and as shown there is mounted on top of the tractor frame a fifth wheel 46, which is in the form of a complete circle, the upper surface of which is channeled and into which extends a wheel 47, suitably supported by webs 48 extending down from the under surface of the fifth wheel carrying frame 56 to the top of which the body of the truck to which the tractor is to be attached is bolted. In order to hold the wheel 47 in the channel I preferably secure to the one edge of the channel, as by bolts 49, a series of sector shaped plates 50, the inner edge of said plates extending over the outer edge of the fifth wheel 46 and adjacent to the side of the web 45.

On the forward portion of the fifth wheel 46 I provide gear teeth 51 engaged by a gear 52 carried on the lower end of a steering shaft 53 having a hand wheel 54 at its upper end and passing through a suitable bearing 55 on the fifth wheel carrying frame 56, whereby the driver can steer the same.

Mounted on the under side of the fifth wheel carrying frame 56 are a pair of downwardly projecting supporting plates 57 between which extends a shaft 58 on which is journaled a pair of bell crank levers 59, 60. The upper end of these levers is connected by means of the links 61, 62, to a gear shifting lever 63 of any ordinary or desired type so arranged that it can then operate the bell crank lever 59 or 60 as desired.

64 designates a hollow hub fixedly supported between the plates 57 by means of the outwardly extending arms 65 having the screw-threaded reduced end 66 passing through the plates 57 and loosely held in place by means of a lock nut 68. The hub 64 is hollow and slidably mounted therein is the upper end of a hollow sleeve 69. The sleeve 69 is provided just below the hub 64 with outwardly projecting pins 70 located on opposite sides of the sleeves, these pins being engaged by the forked ends 71 of the bell crank lever 60. The tube at its lower end passes through a bearing 72 supported by the oppositely extending arms 73 loosely bolted between a pair of plates 74, carried by brackets 75 fast on the longitudinally extending plates 13 on the tractor. The hubs 72 and the hub 64 are in line with the center of rotation of the tractor, whereby the turning movement of the tractor will not affect the vertical movement of the sleeve. Formed on the lower portion of the sleeve 69 is a ring 75', provided with a groove 76', into which extends an inwardly projecting flange 77, carried by a pair of half rings 78, each half ring being provided with an outwardly projecting pin 79, which in turn is engaged by the forked ends 80 of a bell crank lever 81 journaled on a shaft 82, supported between the plates 74. The other arm of the bell crank lever is connected by a rod 83 with the transmission in the usual manner.

Slidably mounted upon the sleeve 69 and intermediate the pins 70 and the rings 75 is a sliding collar 84, from the upper portion of which extends on opposite sides thereof a pair of pins 85 engaged by the forked ends 86 of the bell crank lever 59. The collar 84 has extending therefrom a ring 87 provided with a groove 88, the ring being surrounded by a two-part ring 89 provided with an inwardly projecting portion 90 extending into the groove 88. The two-part ring 89 carries the projecting pins 91 on opposite sides thereof which are engaged by the forked ends 92 of a bell crank lever 93, journaled on the shaft 82, the bell crank lever at its opposite end being connected by a rod 94 to the transmission in the usual manner.

From the foregoing construction it will be seen that through the pairs of bell crank levers and the sliding sleeve connection that the transmission can be operated to shift the gears in the ordinary way irrespective of the position of the tractor with relation to the truck, the turning of the parts on the sleeve permitting of the operation of the gear fitting lever irrespective of the position of the tractor with relation to the truck.

In Fig. 7 I have indicated at 100 a clutch of ordinary type, which is adapted to be thrown into and out of engagement by a bell crank lever 101, in the ordinary manner. In order to operate the bell crank lever from the truck irrespective of the position of the tractor, I have connected to the free end of the lever a rope or cable 102, which extends up through the sleeve 69, the hubs 64 and 72, and also through a curved guiding extension 103 formed on top of the hub 64, the cable or cord 102 being connected at its upper end on the truck to a lever 103 pivotally mounted thereon. Preferably, and as shown, I provide the lever 103 with an offset portion 104, adapted to be engaged by a cam roller 105, carried on a foot lever 106, pivoted at 107, the construction being such that the cam projection 105 will engage the lever 103, and move the same sufficiently to disconnect the clutch, when it will pass over on the portion 104 and hold the clutch out during further movement of the lever 106, without further movement of the lever 103. To the lever 104 is connected a cable or rope 108, which passes down through a guide opening in the guiding extension 103, through the sleeve 69, and through a rearwardly turned guide 109. The lower end of the rope or cord 108 is connected to brake bands, preferably mounted on the jack shaft 17 of the tractor. In the form of construction shown this is effected by connecting the brake bands 109 of any ordinary or desired type together by means of a rope or cable 110 passing over suitable pulleys 111, mounted upon the longitudinally extending bars 13 and connecting the cable 108 to the central portion of the cable 110. By this construction the braking force will be exerted evenly on both jack shafts. In addition to the brake just described I may also provide the truck with a brake lever 112, suitably connected to brake mechanism on the rear wheels of the truck as shown.

113 indicates an accelerator, which is shown as being mounted in the foot-board in front of the driver's seat, to be depressed by the foot, and is connected to one end of the bell crank lever 114, to the other end of which is connected one end of a cord or cable 115, which passes through a guide 116 formed in the hub 64, the cable passing through the sleeve 69 and connected at its lower end to one end of a bell crank lever 117, pivoted at 118 between the plates 74, the other end of the bell crank lever being connected by the rod 119 to a carbureter 120, to operate the carbureter in the usual manner. In order that the tractor when removed from under a body may be readily run to any place that may be desired, I have provided a caster 130, journaled in a fork 131 vertically pivoted in one end of an arm 132, which may, whenever desired, be secured to the tractor by passing the bolt 133 through an opening in the end of the arm and also through the perforated lug 134 and held from turning by the locking pin 135. When through with the caster it may be removed by taking out the bolt and locking pin.

From the foregoing construction it will be seen that while the tractor carries all the driving and power mechanism for the truck, and is turned in steering. the truck, I have provided means whereby the necessary operations of changing gears, controlling the gas supply and applying brakes to the wheels of the tractor can be effected by the operator seated on the truck, and this can be done whatever may be the position of the tractor in relation to the truck. It is also to be noted that the fifth wheel frame carrying the steering wheel and operating levers can be detached from the body or the truck and another body substituted without difficulty.

I realize that considerable variation is possible in the details of construction and arrangement of parts without departing from the spirit of my invention, and I therefore do not intend to limit myself to the specific form shown and described.

Having thus described my invention what I claim as new and desire to secure by Letters Patent is:

1. In a tractor for motor vehicles, the combination with a frame, of a pair of bars extending longitudinally of the frame and intermediate the sides thereof, a fixed axle, a pair of wheels rotatably mounted on said axle, a pair of springs interposed between the axle and the frame, a pair of downwardly extending yokes mounted on the intermediate bars and engaging squared portions of the axle to prevent rotation or horizontal movement thereof, a motor suspended from said intermediate bars and gearing connections between said motor and the wheels.

2. In a tractor for motor vehicles, the combination with a frame, of a fixed axle, a pair of wheels rotatably mounted on the axle, a pair of springs interposed between the axle and frame, jackshafts, means for driving the jack shafts including a motor and differential gearing, a sprocket on each jack shaft, a bracket swingingly mounted adjacent each wheel and concentric therewith, a shaft journaled in each bracket, a sprocket on each shaft, a sprocket chain connecting the sprockets on the jack shaft with the last mentioned sprockets, a gear on each shaft, a second gear secured to each wheel with which said first-mentioned gear meshes, and spring mechanism connected to the bracket to keep a tension on said chains.

3. In a tractor for motor vehicles, the combination with a frame, of a fixed axle, a pair of wheels rotatably mounted on the axle, a pair of springs interposed between the axle and the frame, jack shafts, means for driving the jack shafts, including a motor and differential gearing, a sprocket on each jack shaft, a bracket mounted on the axle adjacent each wheel, a shaft journaled in each bracket, a sprocket on each shaft, a sprocket chain connecting the sprockets on the jack shafts with the last-mentioned sprockets, a gear on each shaft, a second gear secured to each wheel with which said first mentioned gear meshes, a pair of rods secured to each bracket at one end, a plate connecting the other ends of the rods together, a second rod passing through said plate and provided with a head, a spring interposed between said head and said plate, and means connecting said rod with the frame.

4. In a tractor for motor vehicles, the combination with a frame, of a pair of wheels mounted thereon, driving mechanism for the wheels comprising a motor, and transmission gears, a bearing mounted at the center of rotation of the tractor, a second bearing mounted on the body of the vehicle in line with said first mentioned bearing, a sleeve slidably mounted in said bearings, means on the vehicle body for moving the sleeve and connections between the sleeve and the transmission gears whereby the gears may be shifted from the vehicle.

5. In a tractor for motor vehicles, the combination with a frame, of a pair of wheels mounted thereon, driving mechanism for the wheels comprising a motor and transmission gears, a bearing mounted at the center of rotation of the tractor, a second bearing mounted on the body of the vehicle in line with said first mentioned bearing, a sleeve slidably mounted in said bearing, and a second sleeve mounted on said first sleeve and slidable thereon, means on the vehicle body for moving either of said sleeves independently of the other, and connections between each of said sleeves and the transmission gears whereby the gears may be shifted from the vehicle.

6. In a tractor for motor vehicles, the combination with a frame, a pair of wheels mounted thereon, driving mechanism for the wheels comprising a motor, transmission gears and a clutch interposed between the motor and the transmission gears, a bearing mounted at the center of rotation of the tractor, a second bearing on the body of the vehicle in line with said first-mentioned bearing, a sleeve slidably mounted in said bearings, means on the vehicle body for moving the sleeve, connections between the sleeves and the transmission gears whereby the gears may be shifted from the vehicle, a cable extending through said sleeve, and connected to the clutch operating mechanism, and means mounted on the vehicle whereby said cable may be operated to disconnect the clutch.

7. In a tractor for motor vehicles, the combination with a frame, of an axle, a pair of wheels mounted on the axle, jack shafts, means for driving the jack shafts, a sprocket on each jack shaft, gears connected to each wheel, a second gear meshing with each of said first mentioned gears, a sprocket connected to each of said second mentioned gears, sprocket chains connecting each pair of sprockets, means permitting said second-mentioned rears to move circumferentially of said first-mentioned gears, and spring mechanism adapted to keep a tension on the chains.

In testimony whereof I affix my signature in presence of two witnesses.

JOHN MAX. MEYERS.

Witnesses:
CHARLES R. PALMERS,
GEO. J. MOSS.